United States Patent
Ohtake

(10) Patent No.: US 11,069,029 B2
(45) Date of Patent: Jul. 20, 2021

(54) INFORMATION PROCESSING DEVICE, SYSTEM, INFORMATION PROCESSING METHOD, AND STORAGE MEDIUM

(71) Applicant: CANON KABUSHIKI KAISHA, Tokyo (JP)

(72) Inventor: Masaya Ohtake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/160,033

(22) Filed: Oct. 15, 2018

(65) Prior Publication Data
US 2019/0114741 A1     Apr. 18, 2019

(30) Foreign Application Priority Data

Oct. 18, 2017   (JP) .............................. JP2017-201855

(51) Int. Cl.
| | |
|---|---|
| G06T 3/40 | (2006.01) |
| H04N 5/232 | (2006.01) |
| G06T 7/593 | (2017.01) |
| G06K 9/32 | (2006.01) |
| H04N 7/18 | (2006.01) |

(52) U.S. Cl.
CPC .......... *G06T 3/4038* (2013.01); *G06K 9/3233* (2013.01); *G06T 7/596* (2017.01); *H04N 5/23238* (2013.01); *H04N 5/232125* (2018.08); *H04N 7/181* (2013.01)

(58) Field of Classification Search
CPC .............................. G06T 3/4038; G06T 7/596
See application file for complete search history.

(56) References Cited

U.S. PATENT DOCUMENTS

| | | |
|---|---|---|
| 7,365,653 B2 | 4/2008 | Yang et al. |
| 8,155,385 B2 | 4/2012 | Mizuta |
| 9,050,931 B2 | 6/2015 | Yamamoto et al. |
| 9,098,928 B2 | 8/2015 | Mizuta |
| 9,308,863 B2 | 4/2016 | Miyoshi et al. |
| 9,919,650 B2 | 3/2018 | Miyoshi et al. |
| 10,479,275 B2 | 11/2019 | Miyoshi et al. |
| 2006/0202984 A1 | 9/2006 | Yang et al. |

(Continued)

FOREIGN PATENT DOCUMENTS

| | | |
|---|---|---|
| CN | 1831479 A | 9/2006 |
| CN | 1953553 A | 4/2007 |

(Continued)

OTHER PUBLICATIONS

Extended European Search Report dated Mar. 8, 2019, issued in European Application No. 18200680.9.

(Continued)

*Primary Examiner* — Tuan H Nguyen
(74) *Attorney, Agent, or Firm* — Venable LLP

(57) ABSTRACT

An information processing device has at least one memory that stores instructions, and at least one processor coupled to the at least one memory, and configured to set, on a combined image in which a plurality of images captured through a plurality of imaging units are combined, an object region that is a region to be an object of a predetermined process, and to perform, when a boundary between images included in the plurality of images in the combined image is included in the set object region, a predetermined display process on a display unit.

17 Claims, 10 Drawing Sheets

(56) References Cited

U.S. PATENT DOCUMENTS

| | | | |
|---|---|---|---|
| 2007/0085901 A1 | 4/2007 | Yang et al. | |
| 2009/0097708 A1* | 4/2009 | Mizuta | G06T 11/00 |
| | | | 382/103 |
| 2009/0128630 A1 | 5/2009 | Kanaoka et al. | |
| 2012/0069182 A1* | 3/2012 | Sumi | H04N 7/181 |
| | | | 348/148 |
| 2012/0154592 A1 | 6/2012 | Mizuta | |
| 2013/0010117 A1 | 1/2013 | Miyoshi et al. | |
| 2014/0152827 A1 | 6/2014 | Yamamoto et al. | |
| 2016/0176349 A1 | 6/2016 | Miyoshi et al. | |
| 2018/0178725 A1 | 6/2018 | Miyoshi et al. | |

FOREIGN PATENT DOCUMENTS

| | | |
|---|---|---|
| CN | 101877775 A | 11/2010 |
| CN | 102804763 A | 11/2012 |
| CN | 103733613 A | 4/2014 |
| CN | 104156527 A | 11/2014 |
| CN | 104794701 A | 7/2015 |
| EP | 2 739 050 A1 | 6/2014 |
| JP | 2005-192057 A | 7/2005 |
| JP | 2007-041791 A | 2/2007 |
| JP | 2009-100095 A | 5/2009 |

OTHER PUBLICATIONS

Mar. 8, 2021 Chinese Official Action in Chinese Patent Appln. No. 201811214445.4.

Apr. 20, 2021 European Search Report in European Patent Appln. No. 18200680.9.

Jun. 8, 2021 Japanese Official Action in Japanese Patent Appln. No. 2017-201855.

* cited by examiner

INFORMATION PROCESSING DEVICE, SYSTEM, INFORMATION PROCESSING METHOD, AND STORAGE MEDIUM

This application claims the benefit of Japanese Patent Application No. 2017-201855, filed on Oct. 18, 2017, which is hereby incorporated by reference in its entirety.

BACKGROUND OF THE INVENTION

Field of the Invention

The present invention relates to an information processing device, an information processing system, an information processing method, and a storage medium that display a boundary region, included in an object region, between a plurality of captured images.

Description of the Related Art

In an imaging device used for an application of surveillance, or the like, a broader range of monitoring is demanded. Accordingly, Japanese Patent Application Laid-Open No. 2005-192057 proposes an imaging device that combines images captured by a plurality of imaging devices and generates a panoramic image of three-hundred sixty degrees around the imaging device.

On the other hand, in some imaging devices used for an application of surveillance, or the like, a function of performing a predetermined process on a region set within a captured image may be implemented. For example, a function of performing a process of determining whether or not a person has passed through a set region or a function of performing a process of detecting how many persons there are in a set region may be implemented.

For example, when performing the process of detecting the number of persons within a set region, it is necessary to identify the shape of a person from an image of the set region. In a panoramic image generated by the imaging device disclosed in Japanese Patent Application Laid-Open No. 2005-192057, however, a position shift may occur between images at the boundary between images combined as a panoramic image. Thus, when a person is located in a portion where a position shift occurs, the shape of the person may not be accurately identified from the image of the set region.

As discussed above, when the region set as an object of a predetermined process includes a portion where a position shift may occur, the predetermined process may not be suitably performed. In such a case, it is necessary to change a view angle of the imaging device or to re-set a region to be an object of the predetermined process. Thus, there is a demand for enabling the user to more easily recognize a situation where the region set as an object of a predetermined process includes a portion where a position shift may occur if such a situation arises.

SUMMARY OF THE INVENTION

An information processing device of the present invention includes a setting unit that sets, on a combined image in which a plurality of images captured through a plurality of imaging units are combined, an object region that is a region to be an object of a predetermined process, and a display control unit that, when a boundary between images included in the plurality of images in the combined image is included in the object region set by the setting unit, performs a predetermined display process on a display unit.

Further features of the present invention will become apparent from the following description of exemplary embodiments with reference to the attached drawings.

BRIEF DESCRIPTION OF THE DRAWINGS

FIG. 2A and FIG. 2B are diagrams illustrating an example of a hardware configuration of an imaging device, or the like.

DESCRIPTION OF THE EMBODIMENTS

Preferred embodiments of the present invention will now be described in detail in accordance with the accompanying drawings.

First Embodiment

Figure 1:
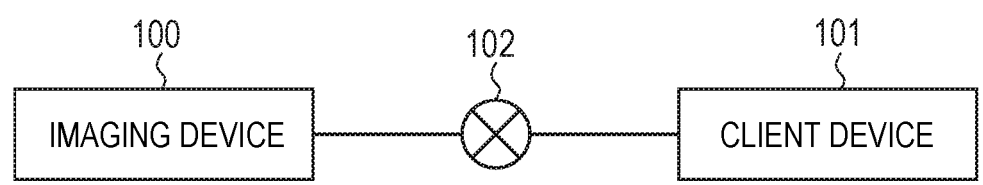
FIG. 1 is a diagram illustrating an example of a system configuration of an information processing system.

FIG. 1 is a diagram illustrating an example of a system configuration of an information processing system of the present embodiment. The information processing system includes an imaging device 100 and a client device 101. The imaging device 100 and the client device 101 are communicably connected to each other via a network 102. The imaging device 100 is an imaging device that includes a plurality of imaging units and combines images captured through the plurality of imaging units to generate a wider angle image than in the case of an image being captured through a single imaging unit. The client device 101 is an information processing device, such as a personal computer (PC), a server device, a tablet device, or the like, that transmits, to the imaging device 100, various commands used for controlling the imaging device 100.

The network 102 is a network such as the Internet, a wireless local area network (LAN), a wired LAN, or the like. Further, the client device 101 may supply power to the imaging device 100 via the network 102.

Figure 2A:
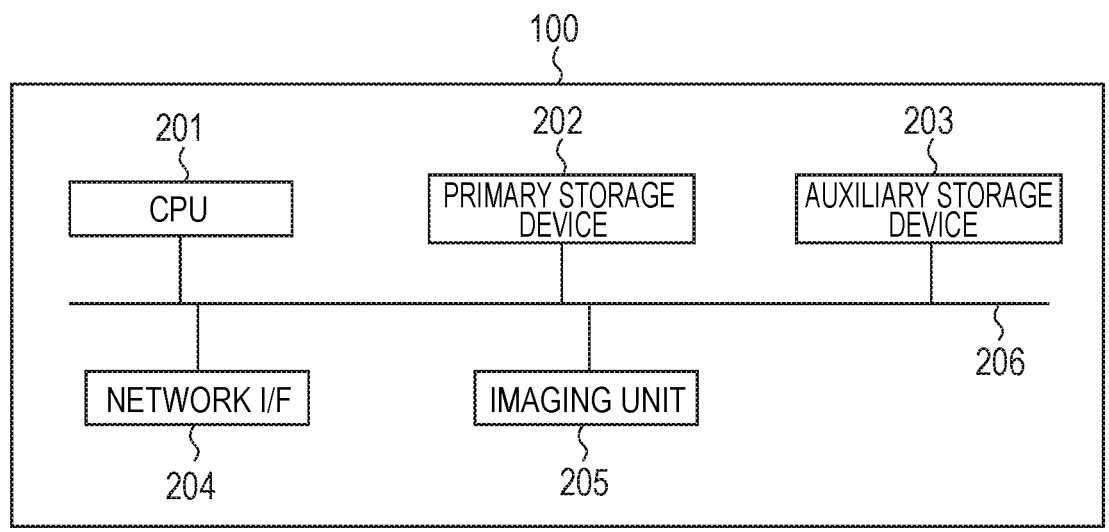

FIG. 2A is a diagram illustrating an example of a hardware configuration of the imaging device 100. The imaging device 100 includes a central processing unit (CPU) 201, a primary storage device 202, an auxiliary storage device 203, a network interface (I/F) 204, and an imaging unit 205. These components are communicably connected to each other via a system bus 206.

The CPU 201 is a central processing unit that controls the imaging device 100. The primary storage device 202 is a storage device that functions as a work area of the CPU 201, a temporal storage area of data, or the like. The primary storage device 202 is implemented by using a storage medium such as a random access memory (RAM). The auxiliary storage device 203 is a storage device that stores various setting information, various programs, or information on images captured by the imaging device 100, or the like. The auxiliary storage device 203 is implemented by using a storage medium, such as a read only memory (ROM), a hard disk drive (HDD), a solid state drive (SSD), or the like.

The network I/F 204 is an interface used for communication with an external device, such as the client device 101 via the network 102. The imaging unit 205 is an imaging unit that includes an image pickup device, such as a charge-coupled device (CCD) sensor, a complementary metal oxide semiconductor (CMOS) sensor, or the like, a lens, and the like, and captures the image. The imaging device 100 includes a plurality of imaging units 205.

Figure 2B:
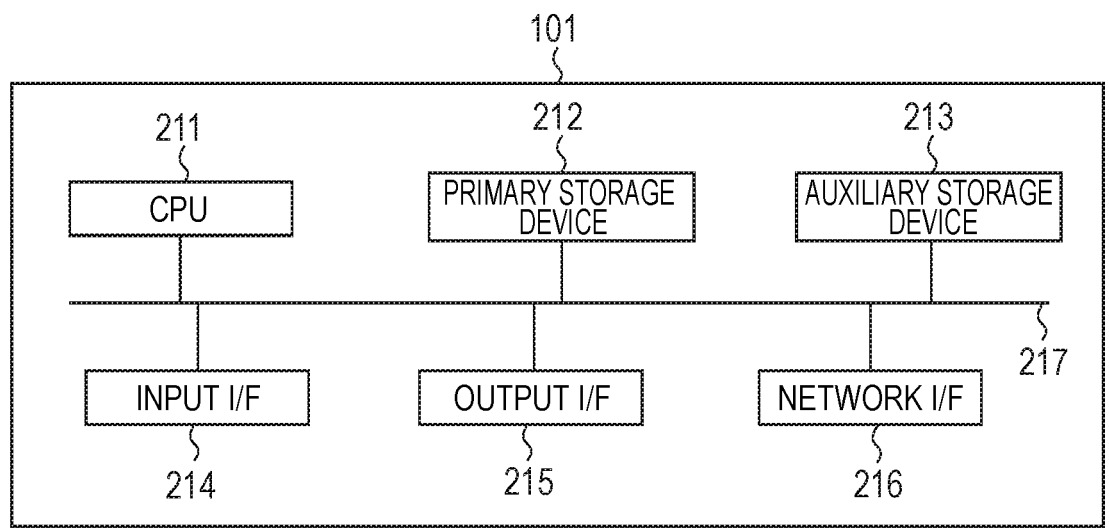

FIG. 2B is a diagram illustrating an example of a hardware configuration of the client device 101. The client device 101 includes a CPU 211, a primary storage device 212, an auxiliary storage device 213, an input I/F 214, an output I/F 215, and a network I/F 216. These components are communicably connected to each other via a system bus 217.

The CPU 211 is a central processing unit that controls the client device 101. The primary storage device 212 is a storage device that functions as a work area of the CPU 211, a temporal storage area of data, or the like. The primary storage device 212 is implemented by using a storage medium such as a RAM. The auxiliary storage device 213 is a storage device that stores various setting information, various programs, information on images captured by the imaging device 100 or the like, information on control commands of the imaging device 100, or the like. The auxiliary storage device 213 is implemented by using a storage medium, such as a ROM, an HDD, an SSD, or the like.

The input I/F 214 is an interface used for connection to an input device, such as a mouse, a keyboard, an operating unit in a touchscreen, or the like. The CPU 211 accepts input via the input I/F 214 from an input device connected to the input I/F 214. The output I/F 215 is an interface used for connection to an output device, such as a monitor, a display, a speaker, a display unit in a touchscreen, or the like. The CPU 211 outputs information via the output I/F 215 to an output device connected to the output I/F 215. The network I/F 216 is an interface used for communication with an external device, such as the imaging device 100 via the network 102.

Figure 3:
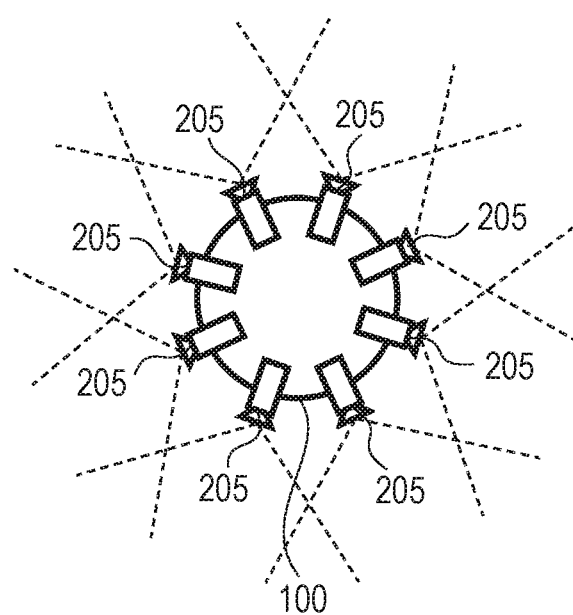
FIG. 3 is a diagram illustrating an example of a general arrangement of the imaging device.

FIG. 3 is a diagram illustrating an example of a general arrangement of the imaging device 100.

The imaging device 100 of the present embodiment includes the plurality of imaging units 205 that are radially arranged as depicted in FIG. 3. Each range interposed between two dashed lines radially extended from each of the imaging units 205 illustrated in FIG. 3 illustrates a field of view of the imaging unit 205. The imaging device 100 generates an image (for example, a panoramic image, or the like) that has a wider angle than an image captured by a single imaging unit by combining images captured through respective imaging units 205. The adjacent imaging units 205 are arranged to have overlapping capturing ranges. The imaging device 100 performs a combining process of images on an overlapping region of capturing ranges of the imaging units 205.

Figure 4:
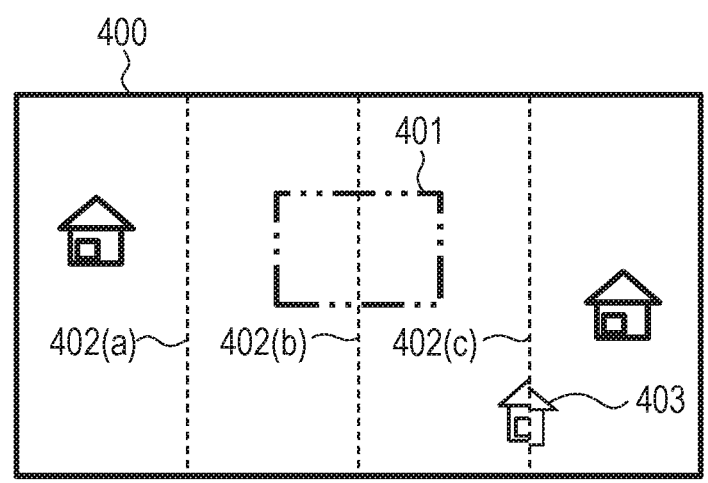
FIG. 4 is a diagram illustrating an example of a combined image.

FIG. 4 is a diagram illustrating an example of a combined image generated by the imaging device 100. A combined image 400 of FIG. 4 is a combined image generated by combining images captured through the four imaging units 205 by the imaging device 100. Each of combined boundaries 402 is a boundary in a combined image 400 between images captured through the imaging units 205. Each position of the combined boundaries 402 in the combined image 400 is a location where a position shift may occur. In the example of FIG. 4, the number of combined boundaries 402 is three of the combined boundaries 402(*a*) to 402(*c*) but may be changed in accordance with the number of images to be used in combination. For example, as seen in the example of FIG. 4, when images are horizontally arranged and combined, and when n images are combined, the number of combined boundaries 402 is n−1.

For example, when the CPU 211 of the client device 101 transmits a command for instructing generation of the combined image 400 to the imaging device 100, the CPU 201 of the imaging device 100 captures images through the plurality of imaging units 205, combines the captured images, and generates the combined image 400. The CPU 201 then transmits the generated combined image 400 to the client device 101. The CPU 211 causes a monitor connected to the output I/F 215 to display the combined image 400, for example. This enables the user to visually recognize the combined image 400 displayed on the monitor. Further, together with the combined image 400, the CPU 201 transmits, to the client device 101, information indicating which position in the combined image 400 each of the combined boundaries 402 is present. The CPU 211 displays the combined image 400 on the monitor and displays respective combined boundaries 402 on the combined image 400 displayed on the monitor based on the information on the position of the combined boundaries 402 received together with the combined image 400. The CPU 211 displays each of the combined boundaries 402 by dashed lines in the present embodiment, but may display it by other display forms, such as dot-dash lines. Further, the CPU 211 may not display each of the combined boundaries 402.

The user can designate a region to be an object of a predetermined process with any size at any position within the combined image 400 displayed on the monitor by performing a drag operation by using a mouse connected to the input I/F 214, for example. The CPU 211 accepts designation of the region to be an object of a predetermined process based on the user operation through the mouse connected to the input I/F 214 and sets a region within the combined image 400 indicated by the accepted designation as the region to be an object of a predetermined process, for example. The region 401 of FIG. 4 is a set region to be an object of a predetermined process.

In the example of FIG. 4, image combination is unsuccessful because the captured ranges do not overlap with each other, and a position shift occurs at a subject 403 present on the combined boundary 402(*c*) of the combined image 400.

Figure 5:
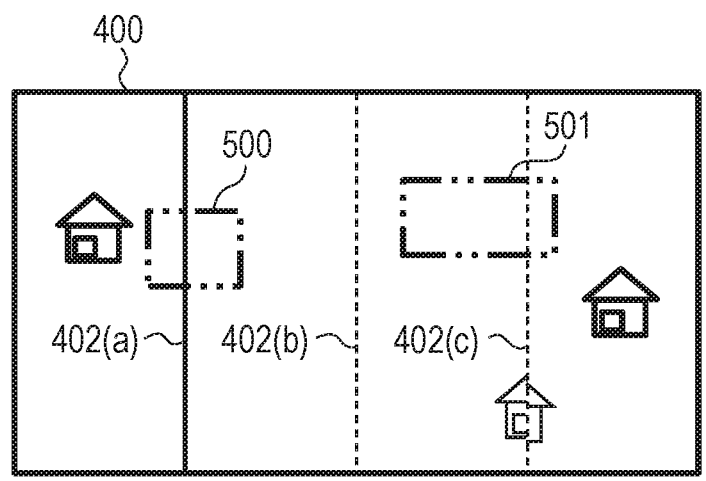
FIG. 5 is a diagram illustrating an example of a combined image.
Figure 6:
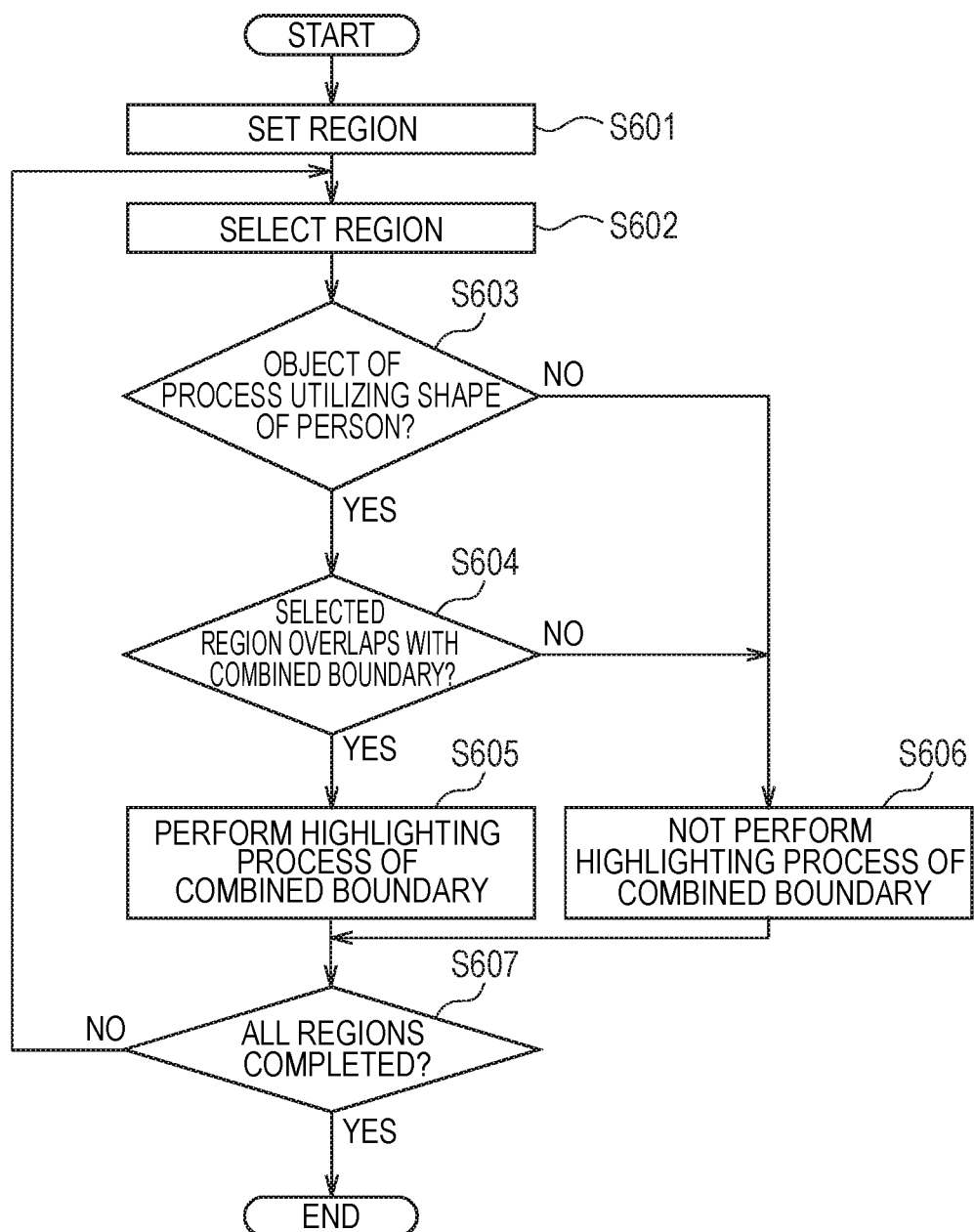
FIG. 6 is a flowchart illustrating an example of a process performed by an information processing system.

FIG. 5 is a diagram illustrating an example of a combined image 400 generated by the imaging device 100. Further, FIG. 6 is a flowchart illustrating an example of the information processing system. An example of the process performed by the information processing system of the present embodiment will be described below by using FIG. 5 and FIG. 6. In the present embodiment, the CPU 211 displays each of the combined boundaries 402 on the combined image 400 displayed on the monitor connected to the output I/F 215 by a dashed line.

The process of FIG. 6 will be described.

In step S601, the CPU 211 sets a region 500 to be an object of a predetermined process and a region 501 to be an object of another process on the combined image 400 based on the user operation through the input device connected to the input I/F 214. In the present embodiment, a predetermined process is a process that utilizes the shape of a predetermined object, such as a process of detecting the number of persons within a region by detecting the shape of a person from the region, for example. While a predetermined object is a person in the present embodiment, it may be other objects, such as an automobile, an animal, a cargo, or the like. Further, in the present embodiment, another process is a process that does not utilize the shape of a predetermined object, such as a process of detecting passage of a person based on a change of an image within a region. The region 500 is an example of an object region that is a region to be an object of a predetermined process. FIG. 5 illustrates a state where the region 500 to be an object of a predetermined process and the region 501 to be an object of another process are set on the combined image 400 illustrated in FIG. 4.

In step S602, the CPU 211 selects one of the regions set within the combined image 400 (the region 500 and the region 501) as a selected region.

In step S603, the CPU 211 determines whether or not the selected region is an object of a process that utilizes the shape of a person. If the selected region is an object of a process that utilizes the shape of a person, the CPU 211 proceeds to the operation of step S604, and, if the selected region is not an object of a process that utilizes the shape of a person, the CPU 211 enters the operation of step S606.

In step S604, the CPU 211 determines whether or not each of the combined boundaries 402 overlaps with the selected region. If any of the combined boundaries 402 overlaps with the selected region, the CPU 211 enters the operation of step S605, and, if none of the combined boundaries 402 overlaps with the selected region, the CPU 211 enters the operation of step S606.

In step S605, the CPU 211 performs a predetermined display process on the monitor connected to the output I/F 215. This enables the CPU 211 to present to the user that the selected region may include the combined boundary 402 that is a portion on which a position shift may occur. In the present embodiment, the CPU 211 performs a display process of highlighting the combined boundary 402 overlapping with the selected region 500 by updating the display form of the combined boundary 402 that is determined to overlap with the selected region in step S604 from a dashed line to a solid line. FIG. 5 illustrates a state where the display form of the combined boundary 402(*a*) overlapping with the region 500 is updated to the solid line. This enables the user to more easily visually recognize that the set region overlaps with the combined boundary 402. Further, the user is able to more easily recognize that the region set as an object of a process that utilizes the shape of a person includes the combined boundary 402 on which a position shift may occur. The operation of step S605 is an example of a display control process.

Figure 7:
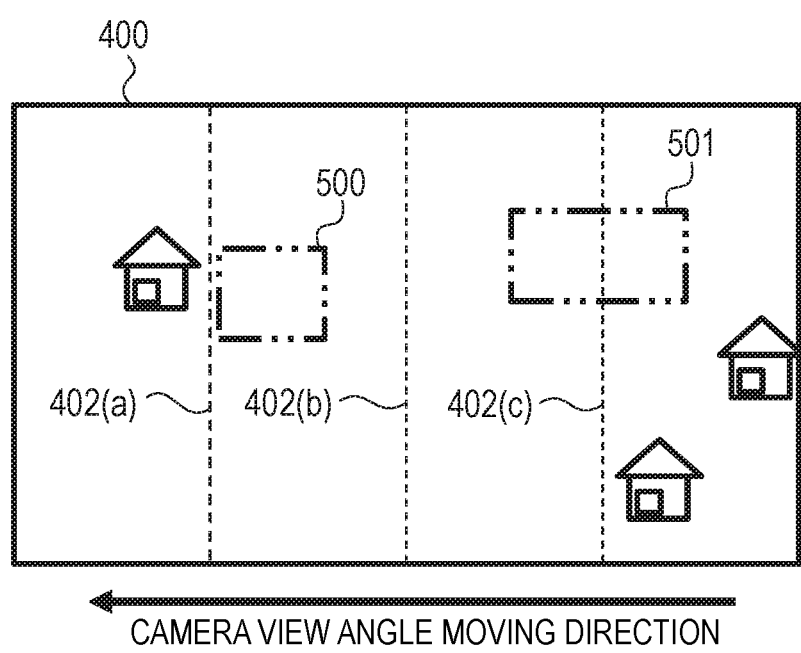
FIG. 7 is a diagram illustrating an example of a combined image.

When the user recognizes that the region set as an object of a process that utilizes the shape of a person includes the combined boundary 402, the user may take the following action. That is, for example, the user may instruct the imaging device 100 through the client device 101 to change each of the view angle of the imaging units 205 so that the region set as an object of a process that utilizes the shape of a person does not include the combined boundary 402. FIG. 7 illustrates the combined image 400 in which the view angle of the imaging unit 205 has been changed so that the region set as an object of a process that utilizes the shape of a person does not include the combined boundary 402. It can be seen that the region 500 does not overlap with the combined boundary 402. Further, for example, the user may change the position of the region set as an object of a process that utilizes the shape of a person to a position that does not include the combined boundary 402 through the client device 101.

In step S606, the CPU 211 determines not to change the display form of the combined boundary 402.

In step S607, the CPU 211 determines whether or not that the operations of steps S603 to S606 have been performed for all the regions set within the combined image 400. If the CPU 211 determines that the operations of steps S603 to S606 have been performed for all the regions set within the combined image 400, the process of FIG. 6 ends. If the CPU 211 determines that there is a region on which the operations of steps S603 to S606 have not yet been performed in the regions set within the combined image 400, the process proceeds to the operation of step S602.

In the present embodiment, in step S605, the CPU 211 performs a display process of displaying, by a display form with a solid line, a line indicating the combined boundary 402 that overlaps with the set region and thereby highlights the line. The CPU 211 may, however, perform a display process of displaying a line indicating the combined boundary 402 that overlaps with the set region by using a predetermined color (for example, red) that is different from the color of the lines indicating other combined boundaries 402 and thereby highlight the combined boundary 402 in interest. Further, in order to highlight the combined boundary 402, the CPU 211 may blink the dashed line that indicates the combined boundary 402 that overlaps with the set region to highlight the combined boundary 402 in interest.

Further, while the combined boundary 402 is displayed by a dashed line in advance in the present embodiment, a line indicating the combined boundary 402 may not be displayed in advance. In this case, the CPU 211 may perform a display process of displaying a line (for example, a straight line, a dashed line, or the like) that indicates the combined boundary 402 that overlaps with a region set as an object of a process that utilizes the shape of a person in step S605, for example. Further, the CPU 211 may perform the following process in order to highlight the combined boundary 402 in step S605. That is, the CPU 211 instructs the imaging device 100 to update the exposure values of two imaging units 205 that capture the combined boundary 402 to be highlighted to different values, respectively. An exposure value is an index that represents an exposure level determined based on an aperture value and an exposure time. The CPU 211 acquires, from the imaging device 100, the combined image 400 in which images captured through the plurality of imaging units 205 including the imaging unit 205 having the updated exposure value are combined. Then, the CPU 211 may display the acquired combined image 400 on the monitor connected to the output I/F 215. Thereby, images different in brightness are arranged on the monitor interposing the combined boundary 402 to be highlighted, which enables the user to visually recognize which of the combined boundary 402 overlaps with the set region.

While the CPU 211 determines not to change the display form of the combined boundary 402 in step S606 in the present embodiment, the dashed line indicating the combined boundary 402 may be deleted.

As discussed above, in the present embodiment, when a region set as an object of a predetermined process overlaps with the combined boundary 402, the information processing system performs a predetermined display process on a monitor connected to the output I/F 215. That is, the information processing system can present to the user that a region set as an object of a predetermined process includes the combined boundary 402 that is a portion on which a position shift may occur. This enables the user to more easily recognize that the region set as an object of a predetermined process includes a portion on which a position shift may occur.

Second Embodiment

In the first embodiment, when a region set as an object of a predetermined process overlaps with the combined boundary 402, the information processing system performs a display process of changing a line indicating the combined boundary 402 in the overlapping portion from a dashed line to a solid line. In such a way, the information processing system performs a display process of changing the display form of a line indicating the combined boundary 402 in the overlapping portion, and thereby presents to the user that the region set as an object of a predetermined process overlaps with the combined boundary 402.

As illustrated in FIG. 3, the field of view of the imaging unit 205 is wider for a farther region from the imaging unit 205. Thus, the fields of view of different imaging units 205 are more likely to overlap with each other for a region more distant from the imaging units 205. Thus, a position shift in the combined boundary 402 in the combined image 400 is more likely to occur for a shorter distance between a subject and the imaging unit 205 that captures the subject (hereafter, referred to as a subject distance), and is less likely to occur for a longer subject distance. That is, even with on the same combined boundary 402, when a subject distance for a subject present on the combined boundary 402 is greater than a certain value, it is assumed that no position shift occurs or, if a position shift occurs, it may be small enough not to affect detection of the shape of an object such as a person. Accordingly, in the present embodiment, the information processing system performs a predetermined display process when a region set as an object of a predetermined process overlaps with the combined boundary 402 and when the subject distance of a subject present in the region is less than or equal to a predetermined threshold.

The system configuration of the information processing system of the present embodiment is the same as that of the first embodiment. Further, the hardware configuration of system components of the information processing system of the present embodiment is the same as that of the first embodiment.

Figure 8:
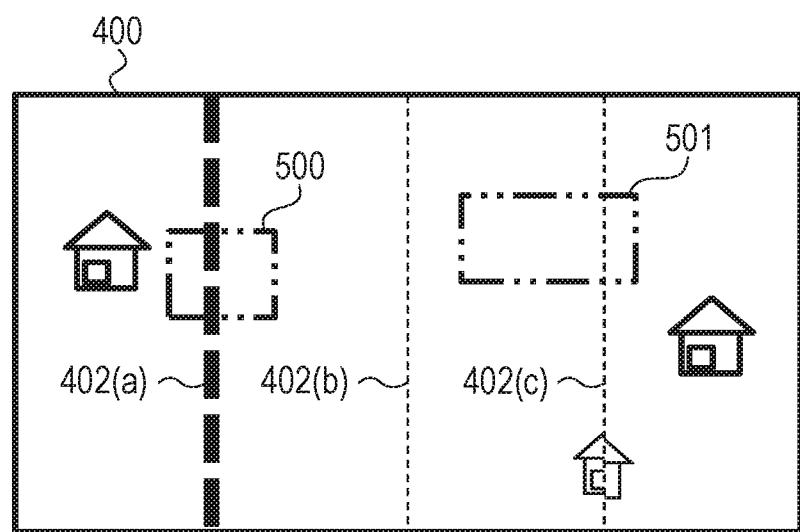
FIG. 8 is a diagram illustrating an example of a combined image.
Figure 9:
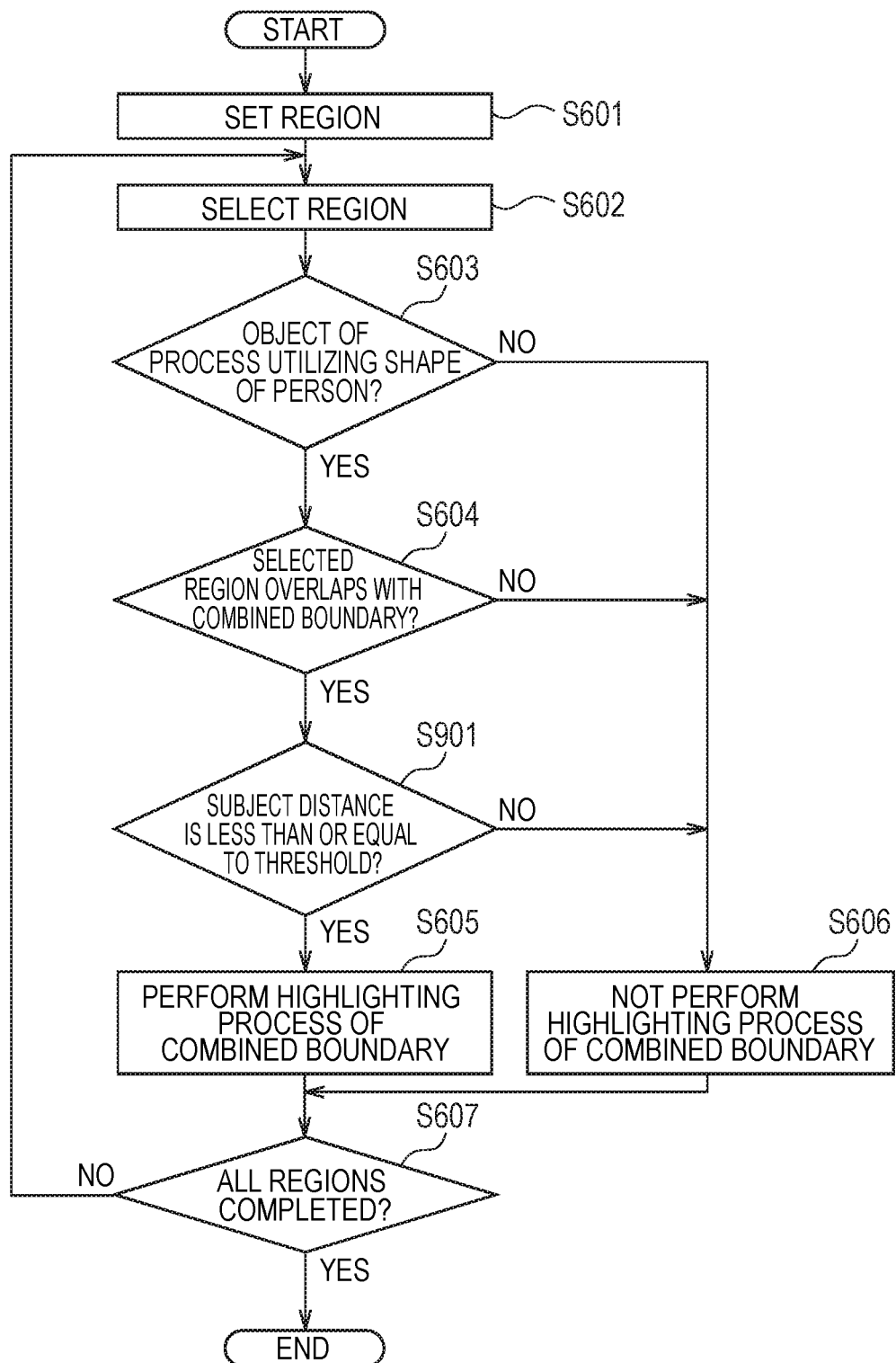
FIG. 9 is a flowchart illustrating an example of a process performed by the information processing system.

FIG. 8 is a diagram illustrating an example of a combined image generated by the imaging device 100. FIG. 9 is a flowchart illustrating an example of the process performed by the information processing system of the present embodiment. An example of the process of the present embodiment will be described by using FIG. 8 and FIG. 9. It is assumed here that combined boundaries between images are displayed by dashed lines in advance.

The operations of steps S601 to S603, S606, and S607 of FIG. 9 are the same as those of FIG. 6.

In step S604, the CPU 211 determines whether or not each of the combined boundaries 402 overlaps with the selected region. If the CPU 211 determines that any of the combined boundaries 402 overlaps with the selected region, the CPU 211 moves to the operation of step S901, and, if the CPU 211 determines that none of the combined boundaries 402 overlaps with the selected region, the CPU 211 moves to the operation of step S606. In step S901, the CPU 211 determines the subject distance for a subject present within a selected region. For example, the CPU 211 uses a Time Of Flight (TOF) scheme to determine the subject distance for a subject present within the selected region. For example, the CPU 211 irradiates the subject with a light through a light emitting unit included in the imaging unit 205 and receives a light reflected from the subject via the light receiving unit included in the imaging unit 205. The CPU 211 then determines the distance between the subject and the imaging unit 205 based on a difference between the time when irradiating the subject with a light and the time when receiving a light reflected from the subject. For example, the CPU 211 calculates subject distances for respective imaging units 205 that capture the subject and determines the averaged value of the subject distances as a subject distance. Alternatively, the CPU 211 may select one out of the imaging units 205 that capture the subject, calculate a subject distance for the selected imaging unit 205, and determine the calculated subject distance as the final subject distance.

The CPU 211 then determines whether or not the determined subject distance is less than or equal to a predetermined threshold. If the CPU 211 determines that the determined subject distance is less than or equal to the predetermined threshold, the CPU 211 enters to the operation of step S605, and, if the CPU 211 determines that the determined subject distance is greater than the predetermined threshold, the CPU 211 enters the operation of step S606.

In step S605, the CPU 211 presents that the selected region includes the combined boundary 402 by performing a display process of changing the display form so as to increase the width of a line that indicates the combined boundary 402 overlapping with the selected region. FIG. 8 illustrates a state where the width of a dashed line indicating the combined boundary 402(*a*) has been increased. It can be seen that the dashed line indicating the combined boundary 402(*a*) is wider than the dashed lines indicating the combined boundaries 402(*b*) and 402(*c*). Further, the CPU 211 may perform the same operation in step S605 as that of the first embodiment.

As discussed above, in the present embodiment, when a region set as an object of a predetermined process overlaps with the combined boundary 402 and when the subject distance of a subject within the set region is included in a range less than or equal to a threshold, the information processing system performs a predetermined display process. In this way, in the present embodiment, when it is assumed that there is no influence of a position shift, the information processing system does not perform a process of presenting that the region to be an object of a predetermined process includes the combined boundary 402 on which a position shift may occur. This enables the information processing system to reduce the usage of the CPU 211, or the like, that would otherwise be caused by an unnecessary process.

In the present embodiment, when a region set as an object of a predetermined process overlaps with the combined boundary 402, and when the subject distance of a subject within the set region is included in a range less than or equal to a threshold, the CPU 211 performs a predetermined display process. When a region set as an object of a predetermined process overlaps with the combined boundary 402, however, the CPU 211 may perform the following display process on the monitor connected to the output I/F 215. That is, the CPU 211 may determine the subject distance of a subject within a set region and perform a display process of changing the width of the combined boundary 402 overlapping with the set region to a width in accordance with the determined subject distance by the same process as the process illustrated in step S901. For example, the CPU 211 may change the width of the combined boundary 402 overlapping with a set region to a greater width for a smaller determined subject distance. This enables the user to visually recognize the degree of a position shift occurring on the combined boundary. Further, when the set region overlaps with the combined boundary 402, and when a subject distance of a subject within the set region is included in a range less than or equal to a threshold, the CPU 211 may perform the same display process.

Third Embodiment

In the first embodiment, when a region set as an object of a predetermined process overlaps with the combined boundary 402, the information processing system changes a line indicating the combined boundary 402 on the overlapping portion from a dashed line to a solid line. In the present embodiment, however, when a region set as an object of a predetermined process overlaps with the combined boundary 402, the information processing system performs a display process of displaying information indicating an error on the monitor connected to the output I/F 215.

The system configuration of the information processing system of the present embodiment is the same as that of the first embodiment. Further, the hardware configuration of system components of the information processing system of the present embodiment is the same as that of the first embodiment.

Figure 10:
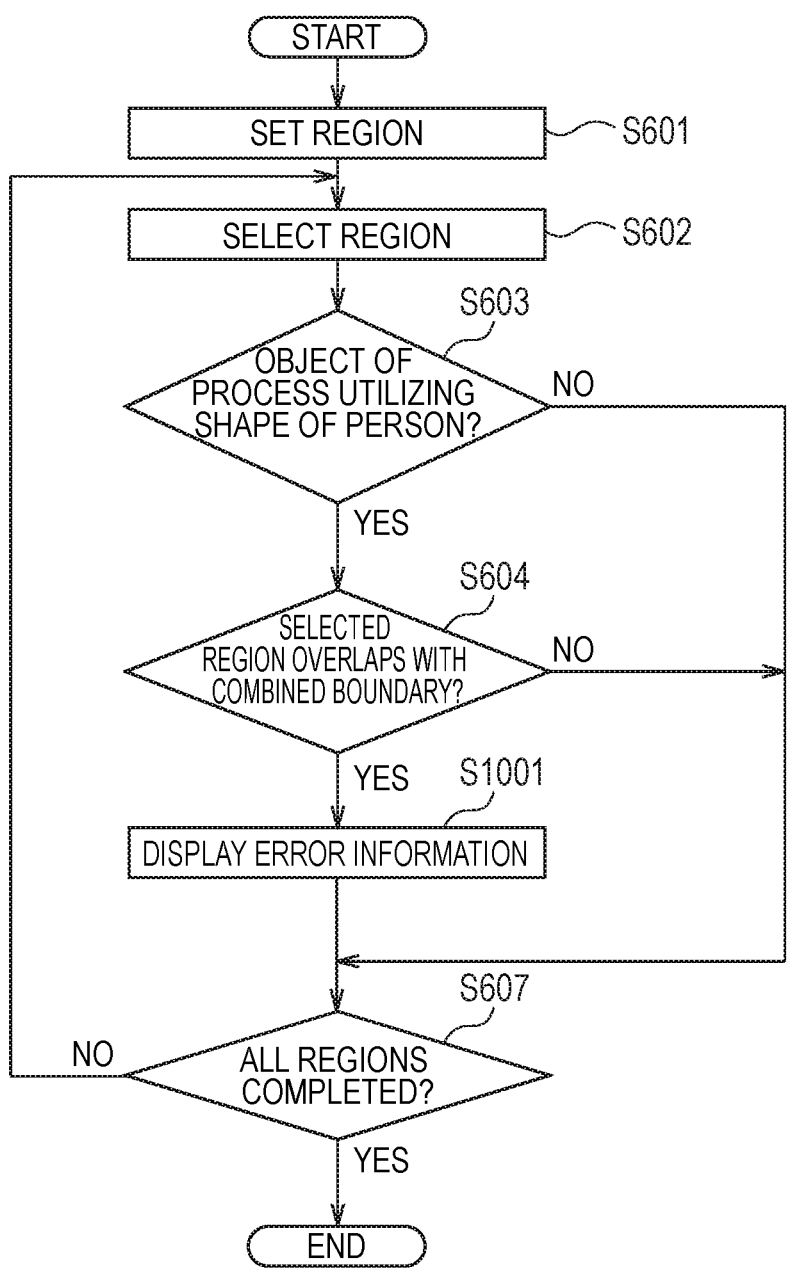
FIG. 10 is a flowchart illustrating an example of a process performed by the information processing system.

FIG. 10 is a flowchart illustrating an example of the process performed by the information processing system of the present embodiment. The operations of steps S601, S602, and S607 of FIG. 10 are the same as those of FIG. 6.

In step S603, the CPU 211 determines whether or not the selected region is an object of a process that utilizes the shape of a person. If the selected region is an object of a process that utilizes the shape of a person, the CPU 211 proceeds to the operation of step S604, and, if the selected region is not an object of a process that utilizes the shape of a person, the CPU 211 ends the process of FIG. 10.

In step S604, the CPU 211 determines whether or not each of the combined boundaries 402 overlaps with the selected region. If any of the combined boundaries 402 overlaps with the selected region, the CPU 211 enters the operation of step S1001, and, if none of the combined boundaries 402 overlaps with the selected region, the CPU 211 ends the process of FIG. 10.

In step S1001, the CPU 211 performs a display process of displaying information indicating an error on the monitor connected to the output I/F 215 and thereby presents to the user that a region set as an object of a predetermined process overlaps with the combined boundary 402. The information indicating an error is information indicating that a selected region is set in an unsuitable position, for example. The information indicating an error may be, for example, a character string, an image, or the like. The CPU 211 displays a character string indicating an error on the monitor connected to the output I/F 215, for example. Further, the CPU 211 may display a popup window to the monitor connected to the output I/F 215 for confirming whether or not to set the selected region without change though the selected region overlaps with the combined boundary 402.

As described above, according to the process of the present embodiment, the information processing system can present more detailed information to the user by displaying information indicating an error.

OTHER EMBODIMENTS

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

For example, a part or whole of the functional configuration of the information processing system described above may be implemented in the imaging device 100 or the client device 101 as hardware.

In the first to third embodiments, the imaging device 100 is a single imaging device including a plurality of imaging units 205. The imaging device 100 may, however, be an information processing device, such as a PC, a server device, or the like, connected to a plurality of imaging devices. In this case, the imaging device 100 uses the plurality of connected external imaging devices as the imaging units 205 in the first to third embodiments.

In the first to third embodiments, the information processing system performs a predetermined display process on a monitor connected to the output I/F 215. The information processing system may, however, perform a predetermined display process on other display devices, such as a display unit of a touchscreen connected to the output I/F 215. Further, the information processing system may perform a predetermined display process on an external screen through a screen projector device connected to the output I/F 215.

In the first to third embodiments, the client device 101 performs the process of FIG. 6, FIG. 9, or FIG. 10. The imaging device 100 may, however, perform the process of FIG. 6, FIG. 9, or FIG. 10. In this case, the imaging device 100 performs the following process. That is, the imaging device 100 generates the combined image 400 and then transmits it to the client device 101. The client device 101 displays the received combined image 400 on a monitor connected to the output I/F 215, for example. The user uses a mouse, or the like, connected to the input I/F 214 to designate a region to be an object of a predetermined process, a region to be an object of another process, or the like. The client device 101 transmits position information on the designated region to the imaging device 100. The imaging device 100 then performs the process of step S602 and the subsequent operations of FIG. 6, FIG. 9, or FIG. 10 based on the transmitted position information. When changing the display form of the combined boundary 402 in step S605, the imaging device 100 transmits information on the changed display form to the client device 101 and instructs the client device 100 to change the display form of the combined boundary 402 on the monitor connected to the output I/F 215. Further, in step S1001, the imaging device 100 transmits and thereby outputs error information to the client device 101 and instructs the client device 101 to display the error information on the monitor connected to the output I/F 215.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing device comprising:
   (A) at least one memory that stores instructions; and
   (B) at least one processor coupled to the at least one memory, and configured to execute the instructions to function as:
   (1) a setting unit that sets, on a combined image in which a plurality of images captured through a plurality of imaging units are combined, an object region that is a region to be an object of a predetermined process; and
   (2) a display control unit that, when a boundary, which is between images included in the plurality of images in the combined image, is included in the object region set by the setting unit, performs a predetermined display process that is a process of highlighting a first line indicating the boundary compared to a second line indicating the boundary, the second line being not included in the object region set by the setting unit.

2. The information processing device according to claim 1, wherein, when the boundary, which is between the images included in the plurality of images in the combined image, is included in the object region set by the setting unit, and, when a distance value between a subject and an imaging unit, which is included in the plurality of imaging units that captures the subject included in the object region, is included in a predetermined range, the display control unit performs the predetermined display process on a display unit.

3. The information processing device according to claim 2, wherein the predetermined range is a range that is less than or equal to a predetermined threshold.

4. The information processing device according to claim 1, wherein, when the boundary, which is between the images included in the plurality of images in the combined image, is included in the object region set by the setting unit, the display control unit performs, on a display unit, the predetermined display process that is a process of displaying the line indicating the boundary, which is between the images included in the plurality of images and which is included in the object region, by the predetermined display form that is different from a display form of a line indicating a boundary, which is between images included in the plurality of images and which is not included in the object region.

5. The information processing device according to claim 1, wherein, when the boundary, which is between the images included in the plurality of images in the combined image, is included in the object region set by the setting unit, the display control unit performs, on a display unit, the predetermined display process that is a process of displaying the line indicating the boundary, which is between images included in the plurality of images and which is included in the object region, by the predetermined display form that is a display form of displaying a predetermined color.

6. The information processing device according to claim 1, wherein, when the boundary, which is between the images included in the plurality of images in the combined image, is included in the object region set by the setting unit, the display control unit performs, on a display unit, the predetermined display process that is a process of displaying the line indicating the boundary, which is between images included in the plurality of images and which is included in the object region, by the predetermined display form that is a display form of displaying the line with a width in accordance with a distance between a subject and an imaging unit, which is included in the plurality of imaging units that captures the subject included in the object region.

7. The information processing device according to claim 1, wherein, when the boundary, which is between the images included in the plurality of images in the combined image, is included in the object region set by the setting unit, the display control unit performs, on the display unit, a display process of displaying a combined image, in which a plurality of images captured through the plurality of imaging units, including predetermined imaging units, are combined, wherein the predetermined imaging units capture the boundary, which is between the images included in the plurality of images included in the object region and that have exposure values updated such that the exposure values are different from each other.

8. The information processing device according to claim 1, wherein the predetermined process is a process of utilizing a shape of a predetermined object.

9. An information processing device comprising:
   (A) at least one memory that stores instructions; and
   (B) at least one processor coupled to the at least one memory, and configured to execute the instructions to function as:
   (1) a setting unit that sets, on a combined image in which a plurality of images captured through a plurality of imaging units are combined, an object region that is a region to be an object of a predetermined process; and
   (2) a display control unit that, when a boundary, which is between images included in the plurality of images in the combined image, is included in the object region set by the setting unit, performs a process of displaying information indicating an error.

10. An information processing method performed by an information processing device, the information processing method comprising:
    a setting step of setting, on a combined image in which a plurality of images captured through a plurality of imaging units are combined, an object region that is a region to be an object of a predetermined process; and
    a display control step of performing a predetermined display process when a boundary, which is between images included in the plurality of images in the combined image, is included in the object region set by the setting step,
    wherein the predetermined display process is a process of highlighting a first line indicating the boundary compared to a second line indicating the boundary, the second line being not included in the object region set by the setting step.

11. A non-transitory storage medium including a program that causes a computer, as a part of an information processing device, to function as:
(A) a setting unit that sets, on a combined image in which a plurality of images captured through a plurality of imaging units are combined, an object region that is a region to be an object of a predetermined process; and
(B) a display control unit that, when a boundary, which is between images included in the plurality of images in the combined image, is included in the object region set by the setting unit, performs a predetermined display process that is a process of highlighting a first line indicating the boundary compared to a second line indicating the boundary, the second line being not included in the object region set by the setting unit.

12. An information processing device comprising:
(A) at least one memory that stores instructions; and
(B) at least one processor coupled to the at least one memory, and configured to execute the instructions to function as:
(1) a setting unit that sets, on a combined image in which a plurality of images captured through a plurality of imaging units are combined, an object region that is a region to be an object of a predetermined process;
(2) a determination unit that determines whether a boundary, which is between images included in the plurality of images in the combined image, is included in the object region set by the setting unit; and
(3) a display control unit that, when the boundary, is included in the object region, causes a display unit to display a line indicating the boundary, and, when the boundary is not included in the object region, causes the display unit not to display the line indicating the boundary.

13. The information processing device according to claim 12, wherein, when (a) the boundary, which is between the images included in the plurality of images in the combined image, is included in the object region set by the setting unit, and (b) a distance value between a subject and an imaging unit, which is included in the plurality of imaging units that captures the subject included in the object region, is included in a predetermined range, the display control unit displays a line indicating the boundary.

14. The information processing device according to claim 13, wherein the predetermined range is a range that is less than or equal to a predetermined threshold.

15. The information processing device according to claim 12, wherein the predetermined process is a process of utilizing a shape of a predetermined object.

16. An information processing method performed by an information processing device, the information processing method comprising:
a setting step of setting, on a combined image in which a plurality of images captured through a plurality of imaging units are combined, an object region that is a region to be an object of a predetermined process;
a determining step of determining whether a boundary, which is between images included in the plurality of images in the combined image, is included in the object region set by the setting step; and
a display control step of causing a display unit to display a line indicating the boundary when the boundary is included in the object region, and causing the display unit not to display the line indicating the boundary when the boundary is not included in the object region.

17. A non-transitory storage medium including a program that causes a computer, as a part of an information processing device, to function as:
(A) a setting unit that sets, on a combined image in which a plurality of images captured through a plurality of imaging units are combined, an object region that is a region to be an object of a predetermined process;
(B) a determination unit that determines whether a boundary, which is between images included in the plurality of images in the combined image, is included in the object region set by the setting unit; and
(C) a display control unit that, when the boundary is included in the object region, causes a display unit to display a line indicating the boundary, and, when the boundary is not included in the object region, causes the display unit not to display the line indicating the boundary.

* * * * *